US008890938B2

(12) United States Patent
Jin

(10) Patent No.: US 8,890,938 B2
(45) Date of Patent: Nov. 18, 2014

(54) DIGITAL PHOTOGRAPHING APPARATUS AND METHOD OF CONTROLLING THE SAME

(75) Inventor: Sung-ki Jin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 434 days.

(21) Appl. No.: 13/236,930

(22) Filed: Sep. 20, 2011

(65) Prior Publication Data
US 2012/0113230 A1    May 10, 2012

(30) Foreign Application Priority Data

Nov. 4, 2010   (KR) .................. 10-2010-0109254

(51) Int. Cl.
*H04N 13/02* (2006.01)
*H04N 13/00* (2006.01)

(52) U.S. Cl.
CPC ....... *H04N 13/0239* (2013.01); *H04N 13/0296* (2013.01); *H04N 13/0246* (2013.01); *H04N 13/0011* (2013.01)
USPC .......................................... 348/47; 348/218.1

(58) Field of Classification Search
None
See application file for complete search history.

(56) References Cited

U.S. PATENT DOCUMENTS

| | | | |
|---|---|---|---|
| 6,847,691 B2 * | 1/2005 | Torikoshi et al. | 375/354 |
| 2006/0146136 A1 * | 7/2006 | Cho | 348/207.1 |
| 2007/0030363 A1 * | 2/2007 | Cheatle et al. | 348/239 |
| 2007/0236514 A1 * | 10/2007 | Agusanto et al. | 345/646 |
| 2007/0263924 A1 * | 11/2007 | Kochi et al. | 382/154 |
| 2011/0242342 A1 * | 10/2011 | Goma et al. | 348/218.1 |

OTHER PUBLICATIONS

WO 2010/112320 A1, Tytgat et al., Oct. 7, 2010.*

* cited by examiner

*Primary Examiner* — Sath V Perungavoor
*Assistant Examiner* — Janese Duley
(74) *Attorney, Agent, or Firm* — Drinker Biddle & Reath LLP

(57) ABSTRACT

A digital photographing apparatus and a method of controlling the same. The digital photographing apparatus that generates a 3D image includes a digital signal processing unit that generates the 3D image based on a first image obtained by photographing a predetermined object and a second image sent from another digital photographing apparatus photographing the object.

18 Claims, 5 Drawing Sheets

DIGITAL PHOTOGRAPHING APPARATUS AND METHOD OF CONTROLLING THE SAME

CROSS-REFERENCE TO RELATED PATENT APPLICATION

This application claims the priority benefit of Korean Patent Application No. 10-2010-0109254, filed on Nov. 4, 2010, in the Korean Intellectual Property Office, the entire disclosure of which is incorporated herein by reference.

BACKGROUND

1. Field of the Invention

Embodiments relate to a digital photographing apparatus and a method of controlling the same, and more particularly, to a digital photographing apparatus that can generate a three-dimensional (3D) image and a method of controlling the digital photographing apparatus.

2. Description of the Related Art

Recently, 3D content including 3D movies and the hardware that can handle 3D content, such as a home 3D television that can reproduce the 3D content and a projector, have started to be supplied. Thus, 3D content and the use thereof have attracted much attention when compared to the past.

As such, digital photographing apparatuses capable of generating 3D images as well as other images that can be enjoyed by users, such as digital cameras or camcorders, have attracted much attention because these apparatuses allow users to make 3D content.

SUMMARY

Embodiments can provide a digital photographing apparatus that can generate a 3D image by exchanging image data and relative position information for obtaining a photographing position from two apparatuses, and a method of controlling the digital photographing apparatus.

According to an embodiment, there is provided a digital photographing apparatus that generates a 3D image. The digital photographing apparatus includes a digital signal processing unit that generates the 3D image based on a first image obtained by photographing a predetermined object and a second image sent from another digital photographing apparatus photographing the object.

A shutter of the digital photographing apparatus and a shutter of the other digital photographing apparatus may be synchronized with each other.

The digital photographing apparatus may further include a communication unit that communicates with the other digital photographing apparatus, wherein the digital signal processing unit may include a photographing controlling unit that generates a shutter synchronization signal so that the digital photographing apparatus and the other digital photographing apparatus photograph the object at a same time and that sends the generated shutter synchronization signal to the other digital photographing apparatus via the communication unit.

The digital signal processing may include a photographing position recording unit that records first position information with respect to the first image together with the first image, an image correction unit that calculates a relative position based on second position information recorded in the second image sent from the other digital photographing apparatus and the first position information and that generates a third image by using the second image and the calculated relative position, and a 3D image generating unit that generates the 3D image by using the first and third images.

The first and second position information each may include at least one selected from the group consisting of a latitude, a longitude, an altitude, and a photographing direction corresponding to a point where the digital photographing apparatus and the other digital photographing apparatus photograph the object.

The digital photographing apparatus may further include a GPS module, and the shutter synchronization signal may be generated by using a universal time coordinate (UTC) of the GPS module.

The digital photographing apparatus may further include a communication module that communicates with the other digital photographing apparatus.

The digital photographing apparatus may share a photographing area for photographing the object with the other digital photographing apparatus.

The digital photographing apparatus may store the generated 3D image in a 3D image format selected from the group consisting of side-by-side, top-down, frame-by-frame, line-by-line, and checkerboard formats.

The communication module may be one of a near field communication module and a wire communication module.

According to another embodiment, there is provided a digital photographing apparatus that generates a 3D image. The digital photographing apparatus includes a photographing controlling unit that controls a photographing operation with respect to an object, generates a shutter synchronization signal in order for the object to be photographed by the digital photographing apparatus and another digital photographing apparatus at a same time, and sends the generated shutter synchronization signal to the other digital photographing apparatus; a photographing position recording unit that records first position information of the digital photographing apparatus in a first image obtained by photographing the object; an image correction unit that calculates a relative position based on second position information recorded in a second image sent from the other digital photographing apparatus and the first position information, and generates a third image by using the calculated relative position and the second image; and a 3D image generating unit that generates the 3D image by using the first and third images.

The first and second position information each may include at least one selected from the group consisting of a latitude, a longitude, an altitude, and a photographing direction corresponding to a point where the digital photographing apparatus and the other digital photographing apparatus photograph the object.

According to another embodiment, there is provided a method of controlling a digital photographing apparatus. The method includes generating a first image by photographing an object by using a first digital photographing apparatus, receiving a second image of the object photographed by a second digital photographing apparatus, and generating a 3D image based on the first image and the received second image.

The method may further include sending a shutter synchronization signal from the first digital photographing apparatus to the second digital photographing apparatus, and synchronizing a shutter of the second digital photographing apparatus with a shutter of the first digital photographing apparatus according to the shutter synchronization signal.

The method may further include recording position information of the first digital photographing apparatus in the first image, receiving position information of the second digital photographing apparatus with the second image, calculating a relative position based on the position information of the first digital photographing apparatus and the received position information of the second digital photographing apparatus, generating a third image by using the calculated relative position and the received second image, and generating a 3D image by using the first and third images.

The position information may include at least one selected from the group consisting of a latitude, a longitude, an altitude, and a photographing direction corresponding to a point where the first digital photographing apparatus and the second digital photographing apparatus photograph the object.

The method may further include sharing a photographing area for photographing the object with the second digital photographing apparatus.

The method may further include storing the generated 3D image in a 3D image format selected from the group consisting of side-by-side, top-down, frame-by-frame, line-by-line, and checkerboard formats.

The shutter synchronization signal may be generated by using a UTC of a GPS module of the first or second digital photographing apparatus.

The first and second digital photographing apparatuses may communicate with each other by using one of a near field communication module and a wire communication module.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
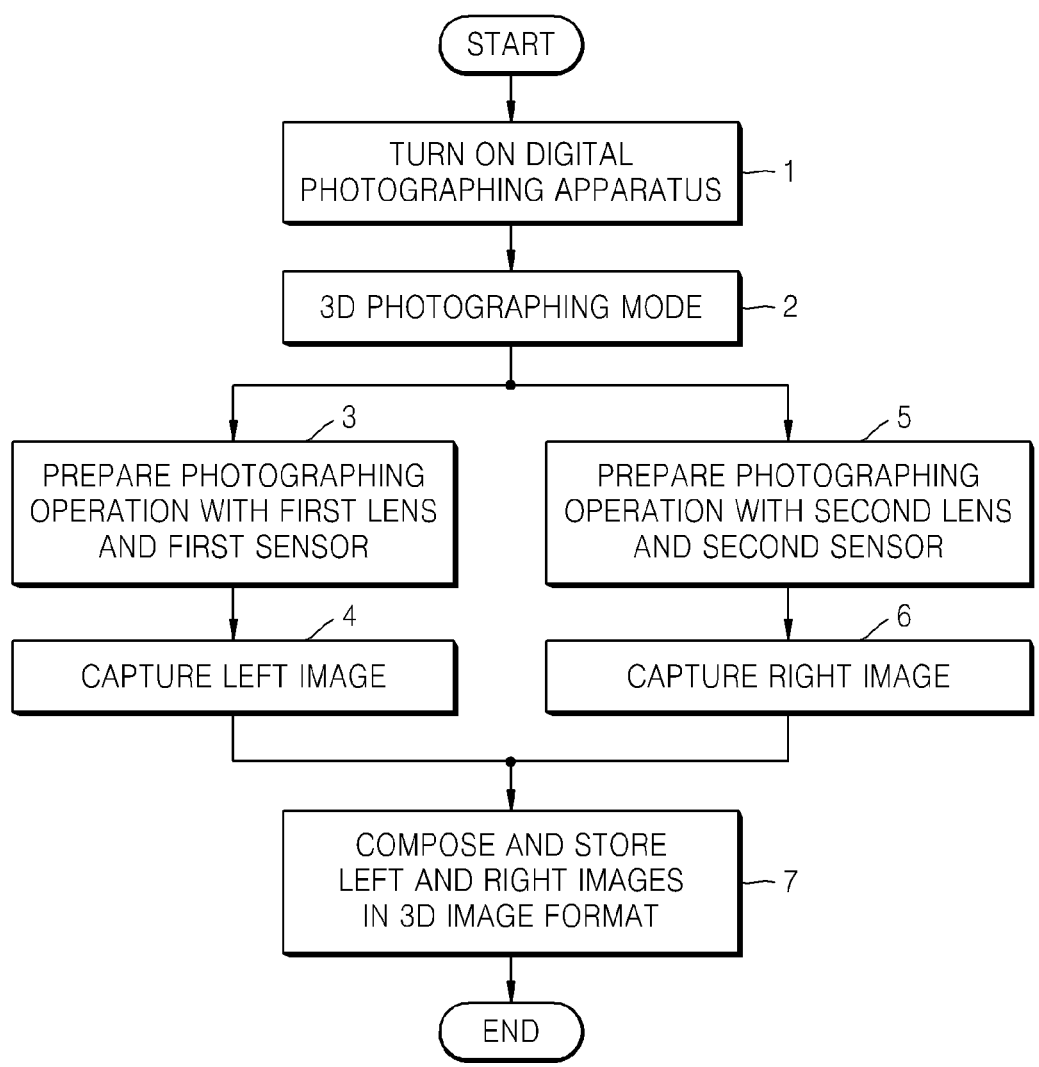
FIG. 1 is a flowchart of a method of generating a 3D image using two lenses and two sensors included in a digital photographing apparatus.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

The terms such as "first" and "second" are used herein merely to describe a variety of constituent elements, but the constituent elements are not limited by the terms. The terms are used only for the purpose of distinguishing one constituent element from another constituent element.

The terms used in the present specification are used for explaining a specific exemplary embodiment and do not limit the inventive concept. Thus, the expression of singularity in the present specification includes the expression of plurality unless clearly specified otherwise in context. Also, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Hereinafter, exemplary embodiments will be described in detail by explaining the exemplary embodiments with reference to the attached drawings. Like reference numerals in the drawings denote like elements.

FIG. 1 is a flowchart of a method of generating a 3D image using two lenses and two sensors included in a digital photographing apparatus.

Referring to FIG. 1, the 3D image can be generated by using the digital photographing apparatus including two lenses and two sensors. In operation 1, the digital photographing apparatus can be turned on. In operation 2, the digital photographing apparatus can enter a 3D photographing mode. In operation 3, preparations for a photographing operation with a first lens and a first sensor can be performed. In operation 5, preparations for a photographing operation with a second lens and a second sensor can be performed. In operations 4 and 6, a left image and a right image can be captured with respect to a single object. In operation 7, a 3D image can be generated by combining the left and right images.

However, because of the first and second lenses and the first and second sensors, the digital photographing apparatus can become relatively large since two lens barrels and two sensors are used. Thus, difficulties may arise in designing the digital photographing apparatus. In addition, due to the amount of energy consumed to drive two image processing systems and an interface problem, there can be many problems that arise in commercializing the digital photographing apparatus. In order to compensate for such problems, a method of generating a 3D image by using one lens or one sensor can be provided. However, when a 3D image is generated by using one lens, a user may not be able to see both the left and right images at the same time. For example, one of the left and right images may be a virtual image generated through an algorithm. When a retouching operation is performed through an algorithm, information other than data within a viewing angle can be generated through the algorithm, and thus it can be difficult to generate perfect left and right images. Accordingly, when a user sees the 3D image, the user may feel dizzy or feel like the 3D image is not a 3D image.

In addition, when one image sensor is used, a time difference can arise between the moment of photographing the left image and the moment of photographing the right image because the image sensor cannot receive light entering from both left and right sides at the same time. Thus, when, for example, a hand-shake occurs during a photographing operation or when an object moves, a normal 3D image may not be produced.

Figure 2:
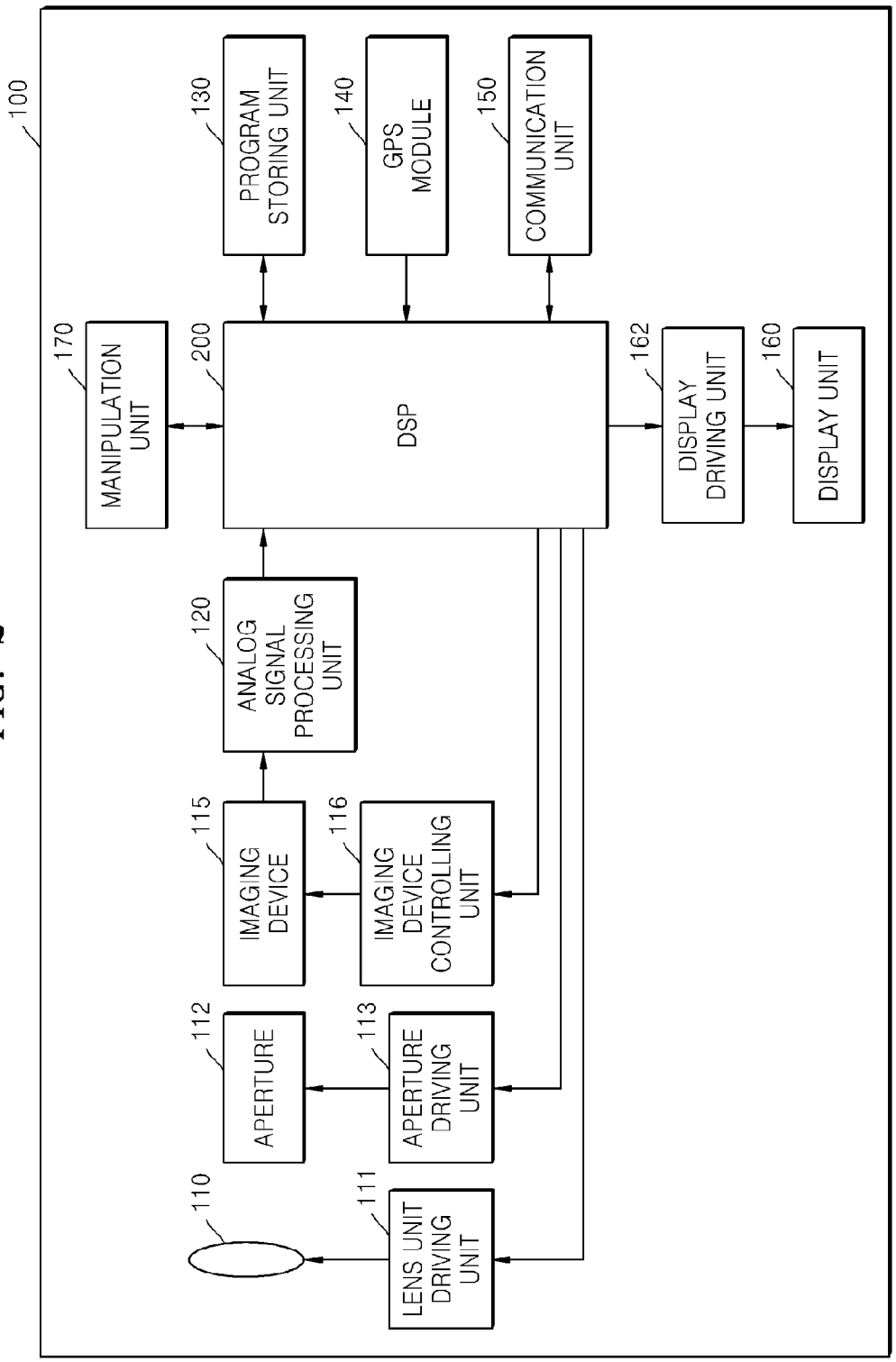
FIG. 2 is a schematic block diagram of a digital photographing apparatus, according to an embodiment.

FIG. 2 is a schematic block diagram illustrating a digital photographing apparatus, according to an embodiment. In the embodiment shown, the digital photographing apparatus can be a digital camera 100.

Hereinafter, the digital camera 100 is described as an example of the digital photographing apparatus, according to an embodiment. However, embodiments are not limited thereto, and thus the digital photographing apparatus may be any digital apparatus, such as a camera phone, a personal digital assistant (PDA), a portable multimedia player (PMP), or the like.

The digital camera 100 may include a lens unit 110, a lens unit driving unit 111, an aperture 112, an aperture driving unit 113, an imaging device 115, an imaging device controlling unit 116, an analog signal processing unit 120, a program storing unit 130, a global positioning system (GPS) module 140, a communication unit 150, a display driving unit 162, a display unit 160, a digital signal processor (DSP) 200, and a manipulation unit 170. In this regard, the lens unit 110, the lens unit driving unit 111, the aperture 112, the aperture driving unit 113, the imaging device 115, the imaging device controlling unit 116, and the analog signal processing unit 120 may be referred to as an imaging unit.

The lens unit 110 can collect an optical signal. The lens unit 110 can include a zoom lens and a focus lens. The zoom lens can increase or decrease a viewing angle according to a focal length, and the focus lens can focus on an object. Each of the zoom lens and the focus lens may be formed of a single lens or a plurality of lenses. The aperture 112 can adjust the quantity of incident light by controlling a degree of opening thereof.

The lens unit driving unit 111 and the aperture driving unit 113 can respectively drive the lens unit 110 and the aperture 112 by receiving a control signal from, for example, the DSP 200. The lens unit driving unit 111 can adjust the focal length by controlling the position of the lens unit 110 and can perform operations of auto-focusing, zooming, and focus change. The aperture driving unit 113 can adjust the degree of opening of the aperture 112. In particular, the aperture driving unit 113 can adjust an f number or an aperture value to perform operations of auto-focusing, auto-exposure correction, focus change, and adjustment of depth of field.

An optical signal passing through the lens unit 110 can form an image of an object on a light receiving surface of the imaging device 115. The imaging device 115 may employ a charge coupled device (CCD), a complementary metal oxide semiconductor image sensor (CIS), or a high-speed image sensor that can convert the optical signal into an electrical signal. The imaging device controlling unit 116 may adjust sensitivity of the imaging device 115. The imaging device controlling unit 116 may control the imaging device 115 according to a control signal automatically generated in response to an image signal that is inputted in real time or a control signal that is manually inputted by a user.

An exposure time of the imaging device 115 can be adjusted by a shutter (not shown). The shutter can include a mechanical shutter that can control input of light by using a blade or an electronic shutter that can control exposure by supplying an electrical signal to the imaging device 115.

The analog signal processing unit 120 can perform noise reduction processing, gain adjustment, waveform shaping, and analog-digital conversion with respect to an analog signal supplied by the imaging device 115.

The manipulation unit 170 may input a control signal when manipulated, for example, by a user. The manipulation unit 170 may include a shutter-release button that can input a shutter-release signal to capture an image by exposing the imaging device 115 to light for a predetermined time, a power button that can input a control signal for powering on/off, a wide-zoom button and a tele-zoom button for widening or narrowing the viewing angle according to an input, and a variety of function buttons that can input a text, can select a mode such as a photographing mode or a reproduction mode, can select a white balance setting function, or can select an exposure setting function. Although the manipulation unit 170 may have a variety of buttons as described above, embodiments are not limited thereto, and any shape such as a keyboard, a touch pad, a touch screen, or a remote controller that may be used by a user for input may be employed therefor.

The digital camera 100 may further include the program storing unit 130 that can store a program such as an operation system or application system for operating the digital camera 100, data necessary for or result data of operations, an image file including an image signal, and various information necessary for the program.

In addition, the digital camera 100 can include a display unit 160 that can display an operation state of the digital camera 100 or can display image information captured by the digital camera 100. The display unit 160 may provide a user with visible information and audible information. To provide visible information, the display unit 160 may include, for example, a liquid crystal display (LCD) panel or an organic light emitting display (OLED) panel. The display driving unit 162 can provide a driving signal to the display unit 160.

The GPS module 140 can measure a latitude, a longitude, an altitude, a speed, and time by using GPS data sent from a satellite. In this regard, the GPS data can include an ephemeris, an almanac, and information indicating time. The ephemeris can be hourly revolution orbital information of GPS satellites and can include estimated future orbital information as well as past and present orbital information. The almanac can be a basic version of the ephemeris and can include schematic position information of all GPS satellites.

A communication unit 150 can perform a short-distance communication with another external digital photographing apparatus (not shown). The communication unit 150 can perform data communication with another digital photographing apparatus under the control of the DSP 200. The communication unit 150 may include a short-distance communication module for technologies such as Bluetooth, infrared light communication, ZigBee, ultra-wideband (UWB), and near field communication (NFC). The communication with another digital photographing apparatus is described below.

The digital camera 100 can include the DSP 200 that can process an input image signal and can control constituent elements of the digital camera 100 according to the input image signal or an external input signal. The DSP 200 may reduce noise with respect to the input image signal and can perform image signal processing for improvement of image quality, such as, gamma correction, color filter array interpolation, color matrix, color correction, or color enhancement. Also, an image file may be generated by compressing image data that has undergone image signal processing, or image data may be restored from the image file. The compression format of an image may be reversible or irreversible. As an example of an appropriate format, a joint photographic experts group (JPEG) format or a JPEG 2000 format may be used. The compressed data may be stored in the program storage unit 130. Also, the DSP 200 may functionally perform sharpening processing, color processing, blur processing, edge emphasis processing, image analysis processing, image recognition processing, or image effect processing. The image recognition processing may include face recognition processing or scene recognition processing. For example, synthesis processing such as luminance level adjustment, color correction, contrast adjustment, contour emphasis adjustment, screen division processing, or character image processing may be performed on a generated image.

Also, the DSP 200 may generate a control signal to control auto-focusing, zoom changing, focus changing, or auto-exposure correction. The DSP 200 can also provide the control signal to the lens unit driving unit 111, the aperture driving unit 113, and the imaging device controlling unit 116. The DSP 200 can generally control the operations of constituent elements, such as the shutter or a flash provided in the digital camera 100, by executing the program stored in the program storing unit 130 or using a separately provided module.

Figure 3:
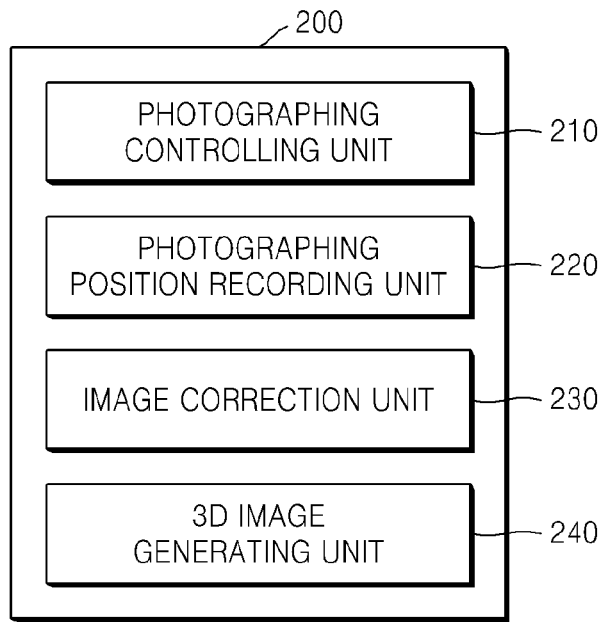
FIG. 3 is a block diagram illustrating a digital signal processor of the digital photographing apparatus illustrated in FIG. 2.
Figure 4:
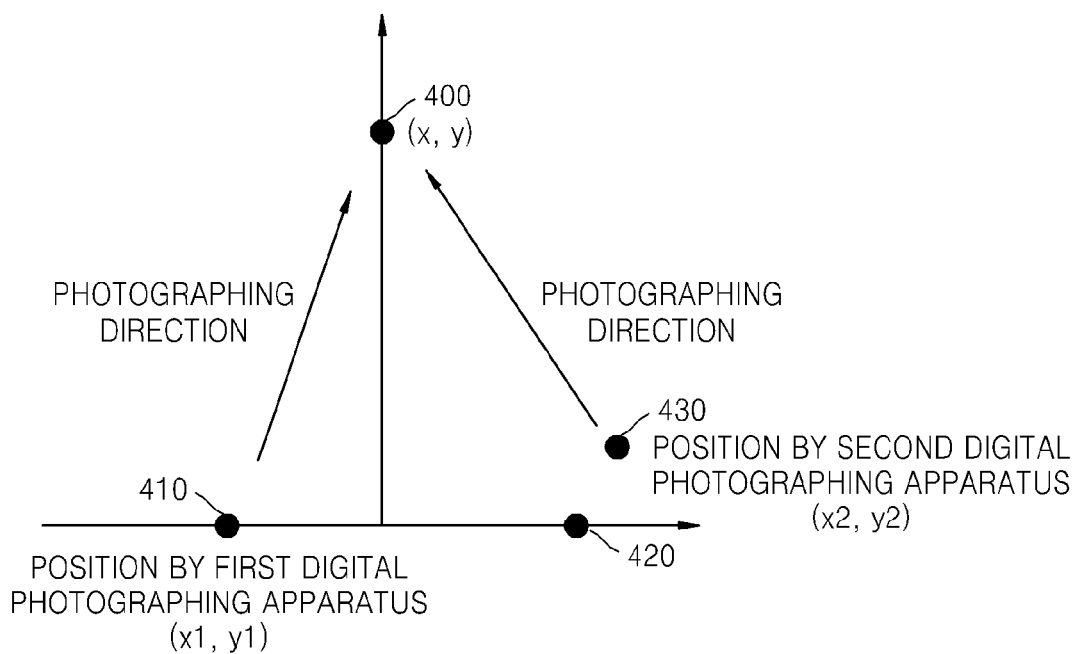
FIG. 4 is a diagram for explaining a method of generating a 3D image, according to an embodiment.

FIG. 3 is a block diagram illustrating the DSP 200 illustrated in FIG. 2. Referring to FIG. 3, the DSP 200 can include a photographing controlling unit 210, a photographing position recording unit 220, an image correction unit 230, and a 3D image generating unit 240. The DSP 200 of the current embodiment can generate a 3D image by photographing an object. The 3D image may be generated by receiving two images, that is, an image captured by the digital camera 100 illustrated in FIG. 2 and an image captured by another photographing apparatus via a predetermined communications network, for example, Wi-Fi. FIG. 4 is a schematic diagram for explaining a method of generating a 3D image, according to an embodiment, by using two photographing apparatuses.

In order to generate a 3D image, images simultaneously captured at positions 410 and 420 can be stored. Since the image captured at position 410 may be generated through a general photographing operation, if the image captured at position 420 is generated at the same time, the 3D image may be realized. In this regard, the image captured at position 410 is captured by a first photographing apparatus, for example, the digital camera 100 illustrated in FIG. 2, and an image captured at a position 430 is captured by a second photographing apparatus, for example, a camera included in a smart phone or a mobile phone. In order to generate an ideal 3D image, the 3D image may be generated by generating left and right images of an object 400 taken from the positions 410 and 420. However, since it is unrealistic to adjust between positions 410 and 420, a position of the object 400 is calculated according to the images respectively captured at positions 410 and 430, relative position information of the photographing apparatuses at positions 410 and 430, and a photographing direction, thereby generating the image that can be captured at position 420 by using the calculated position of the object 400. In this regard, when the image captured at position 420 is generated based on the image captured at position 410, a blind spot, that is, a spot not within view of a lens of the first photographing apparatus at position 420, may be generated. At this time, correction can be performed with respect to the blind spot by using the image captured by the second photographing apparatus at position 430 and the relative position information of the photographing apparatuses to generate the image at the position 420. In the current embodiment, the correction to the image captured at position 420 and the generation of the 3D image can be performed by the first photographing apparatus, but embodiments are not limited thereto. For example, the first photographing apparatus may receive only the image captured at position 430 and the relative position information from the second photographing apparatus, and then back them up onto a personal computer (PC) to perform the correction to the image captured at position 420 and the generation of the 3D image.

In this regard, by adjusting the first photographing apparatus at position 410 and a photographing area of position 420, the photographing area may be shared through a zoom operation. For example, when an image is captured, if the image is displayed on a display unit in the form of a grid through data exchange, a photographing area may be shared between the first photographing apparatus and the second photographing apparatus, which may help a user generate the 3D image. Also, when left and right images are stored, the left and right images can be adjusted. For example, outer portions of the left and right images can be cut off or resizing can be performed. Then, the left and right images can be stored in the form of a 3D image by using a predetermined method.

Referring back to FIG. 3, the photographing controlling unit 210 can generate a shutter synchronization signal in order for an object to be simultaneously photographed by both the first photographing apparatus and the second photographing apparatus as illustrated in FIG. 4 for example. The photographing controlling unit 210 can send the shutter synchronization signal to the second photographing apparatus via a communication unit of the first photographing apparatus, such as communication unit 150 of digital camera 100. In this regard, the shutter synchronization signal can be used to minimize a photographing time difference between the first photographing apparatus and the second photographing apparatus. At the time the user presses a shutter-release button of the first photographing apparatus, the shutter synchronization signal can be sent to the second photographing apparatus, and thus shutters of the first photographing apparatus and the second photographing apparatus can be synchronized, thereby allowing images to be captured simultaneously. The shutter synchronization signal can be applied at the time the shutter-release button of the first photographing apparatus is pressed by the user. At this time, the shutter synchronization signal may be generated by using an internal system clock or a universal time coordinate (UTC) of a GPS module (such as the GPS module 140 of digital camera 100) of the first photographing apparatus and may synchronize the first and second photographing apparatuses for a short time of about $\frac{1}{1000}$ second. In addition, in consideration of a transmission time of the shutter synchronization signal to the second photographing apparatus, the shutter synchronization signal can be sent to the second photographing apparatus at the time the user presses the shutter-release button of the first photographing apparatus, and after a predetermined amount of time elapses, an image may be captured by opening the shutter of the first photographing apparatus. In the above-described embodiment, the user can operate only the shutter-release button of the first photographing apparatus. However, embodiments are not limited thereto, and thus the user may operate a shutter-release button of the second photographing apparatus, or both shutter-release buttons.

The photographing position recording unit 220 can record position information regarding an image of an object photographed by the first photographing apparatus together with the image. The position information can include a latitude, a longitude, an altitude, and a photographing direction corresponding to a point where the digital camera 100 photographs the object. Similarly, the photographing position recording unit 220 can record an image captured by the second photographing apparatus together with relative position information regarding the second photographing apparatus. The position information may be recorded in an exchangeable image file (EXIF) of the image captured by the second photographing apparatus or may be recorded as separate meta data. In the current embodiment, the photographing position recording unit 220 has been described as a constituent element of the digital camera 100 or the first photographing apparatus. The photographing position recording unit 220 may be included in the second photographing apparatus, and thus the photographing position recording unit 220 can similarly record position information regarding an image of an object photographed by the second photographing apparatus together with the image.

The image correction unit 230 can calculate a relative position based on position information recorded in a second image sent from the second photographing apparatus and position information regarding the first photographing apparatus. The image correction unit 230 can generate a third image by using the calculated relative position and the sent second image. The relative position can be a point where images are captured with respect to a single object, for example, the relative position information of the photographing apparatuses at positions 410 and 430 as illustrated in FIG. 4. The relative position information may be obtained by using any of various methods, such as a GPS and a 6-axis sensor or a distance sensor and a 6-axis sensor. Referring back to FIG. 4, positions X and Y of an object can be calculated by using positions X1 and Y1 of the first photographing apparatus and positions X2 and Y2 of the second photographing apparatus, thereby generating an image obtained by capturing the object at the position 420. The image correction unit 230 can convert the received second image into the image captured at the position 420 or the third image.

The 3D image generating unit 240 can generate a 3D image by using a first image and the third image. The 3D image can be generated based on two images generated at the same time and relative position information. First, a left or right image that is to be a main image can be selected, and an image corresponding to a side opposite to the main image can be generated based on the main image and a relative position with respect to the main image. The generated 3D image can be stored in one 3D image format selected from the group consisting of side-by-side, top-down, frame-by-frame, line-by-line, and checkerboard formats. As described above, the generation and storing of the 3D image can be performed in the first photographing apparatus, but embodiments are not limited thereto. For example, after the second photographing apparatus receives the first image captured by the first photographing apparatus and the relative position information, correction of the image and the generation of the 3D image may be performed by backing up the image and the information onto another apparatus, for example, a PC.

Figure 5:
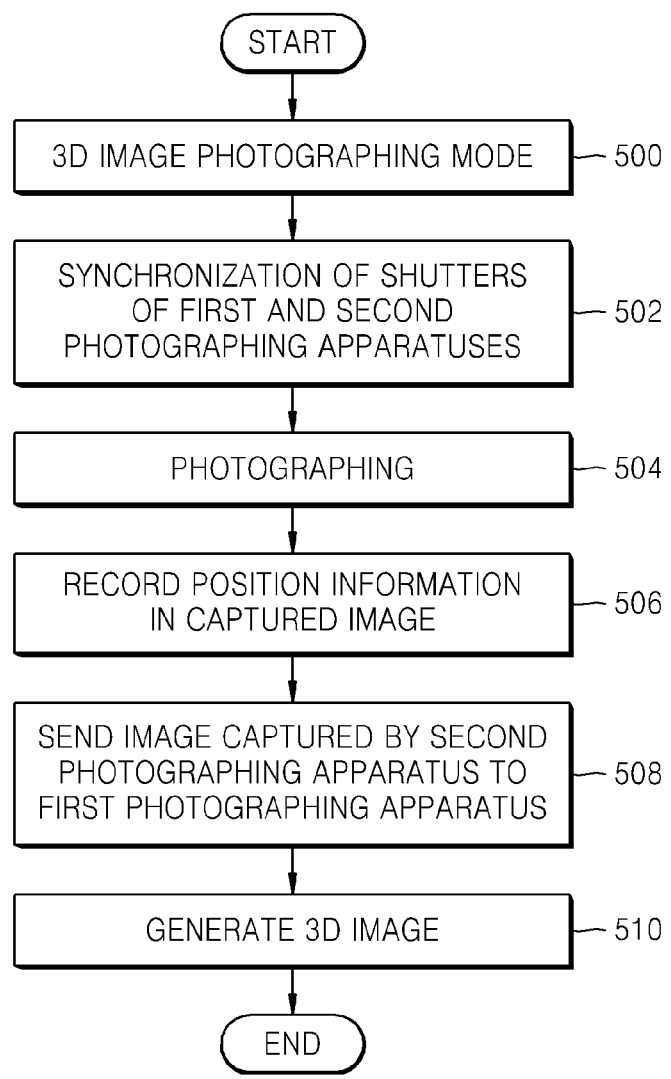
FIG. 5 is a flowchart of a method of controlling a digital photographing apparatus, according to an embodiment.

FIG. 5 is a flowchart of a method of controlling a digital photographing apparatus, according to an embodiment. Referring to FIG. 5, in operation 500, a 3D image photographing mode can be selected. In operation 502, shutters of a first photographing apparatus and a second photographing apparatus can be synchronized. In this regard, the first photographing apparatus, as a main photographing apparatus, may be a digital camera, and the second photographing apparatus, as an auxiliary photographing apparatus, may be a mobile phone or a smart phone including a camera function. The synchronization of the shutters can be performed to synchronize photographing time of the first and second photographing apparatuses. The synchronization of the shutters can be performed by sending a shutter synchronization signal from the first photographing apparatus to the second photographing apparatus.

In operation 504, a single object can be photographed by the first and second photographing apparatuses at the same time to capture respective images. In operation 506, position information regarding the first and second photographing apparatuses, for example, latitude, longitude, altitude, and photographing direction, can be recorded in the images captured by the first and second photographing apparatuses. In operation 508, the image captured by the second photographing apparatus can be sent to the first photographing apparatus. The sent image can include position information regarding the second photographing apparatus. In operation 510, a relative position of the second photographing apparatus with respect to the first photographing apparatus can be calculated based on the position information regarding the second photographing apparatus, and then the relative position and the image sent from the second photographing apparatus can be corrected to generate the 3D image by combining the image captured by the first photographing apparatus and the corrected image.

Figure 6:
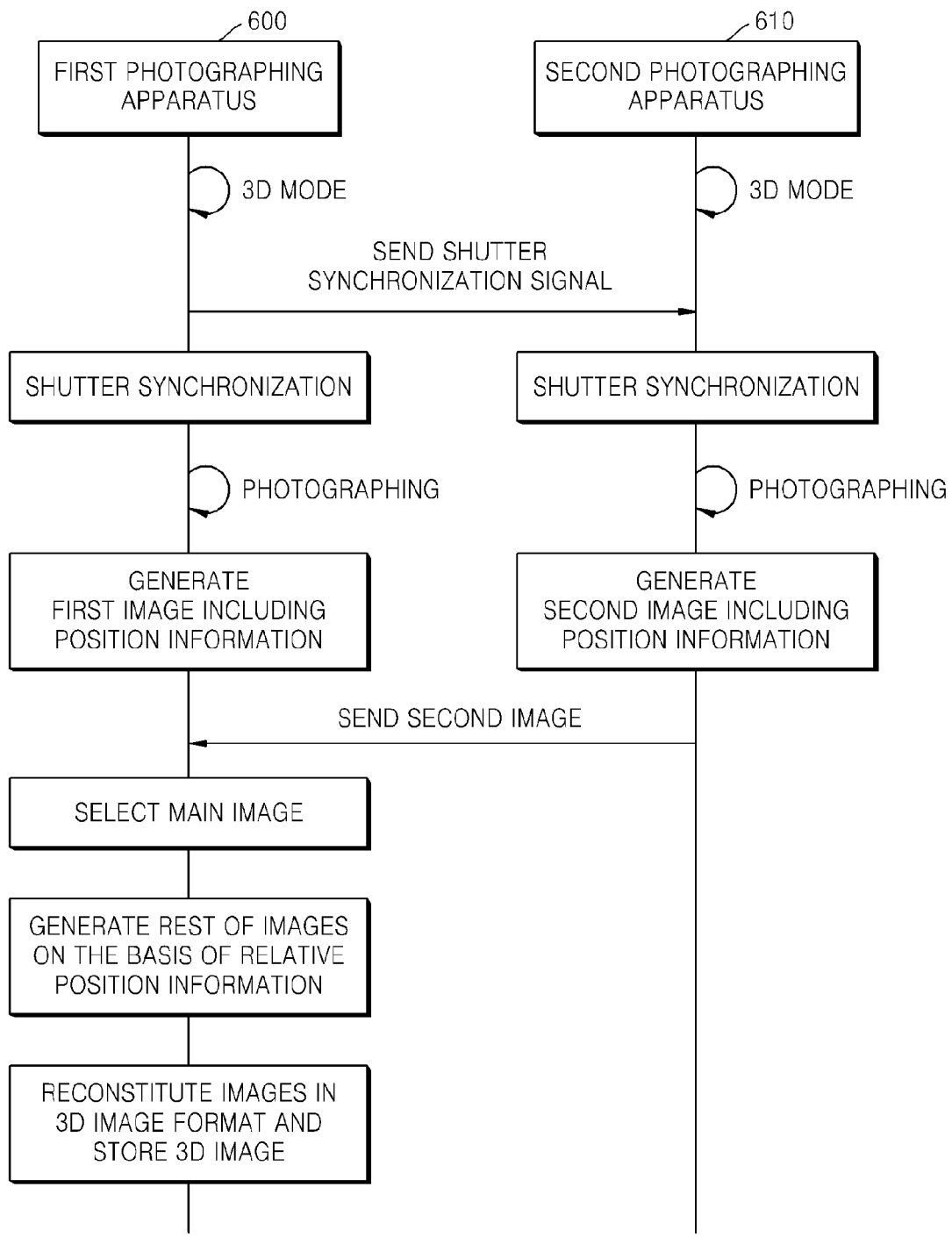
FIG. 6 is a flowchart of a method of controlling a digital photographing apparatus, according to another embodiment.

FIG. 6 is a flowchart of a method of controlling a digital photographing apparatus, according to another embodiment. Referring to FIG. 6, both a first photographing apparatus 600 and a second photographing apparatus 610 can select a 3D mode. The first photographing apparatus 600 can send a shutter synchronization signal to the second photographing apparatus 610. The shutter synchronization signal can be generated at the time a shutter-release button of the first photographing apparatus 600 is pressed and can then be sent to the second photographing apparatus 610. Thus, a shutter of the second photographing apparatus 610 can be synchronized with a shutter of the first photographing apparatus 600. In this regard, the shutter synchronization signal may be a clock signal generated according to a UTC of a GPS module.

The first photographing apparatus 600 and the second photographing apparatus 610 can photograph a single object and respectively can generate a first image and a second image, each including position information thereof. The second image including the position information generated by the second photographing apparatus 610 can be sent to the first photographing apparatus 600.

The first photographing apparatus 600 can select a main image. In this regard, the main image may be selected from among left and right images, and may be selected from among the images captured by the first photographing apparatus 600 and the second photographing apparatus 610. The first photographing apparatus 600 can generate another image or images by calculating relative position information of the photographing apparatuses according to the position information sent from the second photographing apparatus 610 and correcting the second image sent from the second photographing apparatus by using the relative position information and the first image. In the embodiment described herein, the first image can be selected as the main image, and the second image can be corrected.

The first photographing apparatus 600 can generate a 3D image by combining the main image and the second image in a 3D image format and can store the 3D image. The generated 3D image may be stored in any 3D image format selected from the group consisting of side-by-side, top-down, frame-by-frame, line-by-line, and checkerboard formats.

In addition, in the current embodiment, image correction, generation, and storing of the 3D image can be performed in the first photographing apparatus 600, but embodiments are not limited thereto. For example, these operations may be performed by backing up the information and images onto a PC. Also, images used in the detailed description may each be a still image or a movie.

Communication between the first photographing apparatus 600 and the second photographing apparatus 610 may be performed by using a near field communication (NFC) network, such as Wi-Fi or Bluetooth, or by using a wire network.

The device described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable codes executable on the processor on a non-transitory computer-readable media such as read-only memory (ROM), random-access memory (RAM), CD-ROMs, DVDs, magnetic tapes, hard disks, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. Also, using the disclosure herein, programmers of ordinary skill in the art to which the invention pertains can easily implement functional programs, codes, and code segments for making and using the invention.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural, unless the context clearly indicates otherwise. It will also be recognized that the terms "comprises," "comprising," "includes," "including," "has," and "having," as used herein, are specifically intended to be read as open-ended terms of art. The words "mechanism" and "element" are used broadly and are not limited to mechanical or physical embodiments, but can include software routines in conjunction with processors, etc. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. The terminology used herein is for the purpose of describing the particular embodiments and is not intended to be limiting of exemplary embodiments of the invention. Numerous modifications and adaptations will be readily apparent to those skilled in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A digital photographing apparatus that generates a 3D image, the digital photographing apparatus comprising:
   a lens that receives an optical signal;
   an image sensor that converts the optical signal into an electrical signal;
   a digital signal processing unit that generates the 3D image based on a first image obtained by photographing a predetermined object and a second image sent from another digital photographing apparatus photographing the object, wherein the other digital photographing apparatus comprises a second lens and a second image sensor; and
   a communication unit that communicates with the other digital photographing apparatus,
   wherein the digital signal processing unit comprises a photographing controlling unit that generates a shutter synchronization signal so that the image sensor of the digital photographing apparatus and the second image sensor of the other digital photographing apparatus photograph the object at a same time, and sends the generated shutter synchronization signal to the other digital photographing apparatus via the communication unit.

2. The digital photographing apparatus of claim 1, wherein a shutter of the digital photographing apparatus and a shutter of the other digital photographing apparatus are synchronized with each other.

3. The digital photographing apparatus of claim 1, wherein the digital signal processing unit comprises:
   a photographing position recording unit that records first position information with respect to the first image together with the first image;
   an image correction unit that calculates a relative position based on second position information recorded in the second image sent from the other digital photographing apparatus and the first position information and that generates a third image by using the second image and the calculated relative position; and a 3D image generating unit that generates the 3D image by using the first and third images.

4. The digital photographing apparatus of claim 3, wherein the first and second position information each comprise at least one selected from the group consisting of a latitude, a longitude, an altitude, and a photographing direction corresponding to a point where the digital photographing apparatus and the other digital photographing apparatus photograph the object.

5. The digital photographing apparatus of claim 1, wherein the digital photographing apparatus further comprises a GPS module, and the shutter synchronization signal is generated by using a universal time coordinate (UTC) of the GPS module.

6. The digital photographing apparatus of claim 1, wherein the digital photographing apparatus further comprises a communication module that communicates with the other digital photographing apparatus.

7. The digital photographing apparatus of claim 1, wherein the digital photographing apparatus shares a photographing area for photographing the object with the other digital photographing apparatus.

8. The digital photographing apparatus of claim 1, wherein the digital photographing apparatus stores the generated 3D image in a 3D image format selected from the group consisting of side-by-side, top-down, frame-by-frame, line-by-line, and checkerboard formats.

9. The digital photographing apparatus of claim 6, wherein the communication module is one of a near field communication module and a wire communication module.

10. A digital photographing apparatus that generates a 3D image, the digital photographing apparatus comprising:
  a lens that receives an optical signal;
  an image sensor that converts the optical signal into an electrical signal;
  a photographing controlling unit that controls a photographing operation with respect to an object, generates a shutter synchronization signal in order for the object to be photographed by the image sensor of the digital photographing apparatus and a second image sensor of another digital photographing apparatus at a same time, and sends the generated shutter synchronization signal to the other digital photographing apparatus, wherein the other digital photographing apparatus comprise a second lens and the second image sensor;
  a photographing position recording unit that records first position information of the digital photographing apparatus in a first image obtained by photographing the object;
  an image correction unit that calculates a relative position based on second position information recorded in a second image sent from the other digital photographing apparatus and the first position information, and generates a third image by using the calculated relative position and the second image; and
  a 3D image generating unit that generates the 3D image by using the first and third images.

11. The digital photographing apparatus of claim 10, wherein the first and second position information each comprise at least one selected from the group consisting of a latitude, a longitude, an altitude, and a photographing direction corresponding to a point where the digital photographing apparatus and the other digital photographing apparatus photograph the object.

12. A method of controlling a digital photographing apparatus, the method comprising:
  sending a shutter synchronization signal from a first digital photographing apparatus to a second digital photographing apparatus, wherein the first digital photographing apparatus comprises a first lens and a first image sensor, and the second digital photographing apparatus comprises a second lens and a second image sensor;
  synchronizing a shutter of the second digital photographing apparatus with a shutter of the first digital photographing apparatus according to the shutter synchronization signal;
  generating a first image by photographing an object by using the first image sensor of the first digital photographing apparatus;
  receiving a second image of the object photographed by the second image sensor of the second digital photographing apparatus; and
  generating a 3D image based on the first image and the received second image.

13. The method of claim 12, further comprising:
  recording position information of the first digital photographing apparatus in the first image;
  receiving position information of the second digital photographing apparatus with the second image;
  calculating a relative position based on the position information of the first digital photographing apparatus and the received position information of the second digital photographing apparatus;
  generating a third image by using the calculated relative position and the received second image; and
  generating a 3D image by using the first and third images.

14. The method of claim 13, wherein the position information comprises at least one selected from the group consisting of a latitude, a longitude, an altitude, and a photographing direction corresponding to a point where the first digital photographing apparatus and the second digital photographing apparatus photograph the object.

15. The method of claim 13, further comprising sharing a photographing area for photographing the object with the second digital photographing apparatus.

16. The method of claim 13, further comprising storing the generated 3D image in a 3D image format selected from the group consisting of side-by-side, top-down, frame-by-frame, line-by-line, and checkerboard formats.

17. The method of claim 12, wherein the shutter synchronization signal is generated by using a UTC of a GPS module of the first or second digital photographing apparatus.

18. The method of claim 12, wherein the first and second digital photographing apparatuses communicate with each other by using one of a near field communication module and a wire communication module.

* * * * *